Patented Feb. 27, 1934

1,949,147

UNITED STATES PATENT OFFICE 1,949,147

DISPERSED PIGMENT FROM ORGANIC CARBONACEOUS EARTH AND PROCESS FOR PRODUCING THE SAME

Leonard P. Dove, Hinsdale, Ill.

No Drawing. Application August 4, 1931
Serial No. 555,143

26 Claims. (Cl. 8—6)

This invention relates to the production of organic or carbonaceous earth colors in a dispersed or finely divided form for use in wood stains or for coloring other materials of a wide range and variety, the dispersion to a finely divided condition being accomplished without the essential aid of grinding or other mechanical attrition.

The present application contains subject matter in common with my prior applications Serial Nos. 339,290 and 339,281, both filed Feb. 11, 1929, now Patents Nos. 1,877,748, dated Sept. 13, 1932 and 1,898,247, dated Feb. 21, 1933, respectively.

The raw materials employed in connection with the invention and to which the processes have been found to apply are generally known as carbonaceous or organic earths. These materials are found in naturally occurring geologic bodies that have usually been subjected to long oxidation or action of the elements in the air, water or soils.

It has been found in my experiments that most of these organic earths that appear best adapted to treatment by my process are usually brown in color, varying from blackish brown to reddish brown. When ground in oily mediums, these organic earths are usually translucent or semi-transparent in distinction to mineral earth colors composed of oxides of iron or manganese, clay or silicates which are more or less opaque.

Organic earth colors are commonly used where a depth or richness is desired such as in wood stains, grainers and in certain printing inks.

Organic earths are usually composed for the most part of carbon, hydrogen, and oxygen with smaller quantities of admixed clay, ash, sulphur, nitrogen and moisture or other inert earthy materials.

It is generally assumed that these organic earths originated from the decay of plants resulting in coal-like, lignite-like or peat-like bodies which in turn may have become altered by action of the elements. A generic term of ulmic or humic has been applied to these organic earths, regardless of origin.

These earths appear to have a further characteristic in common of forming brownish solutions or colloidal suspensions in water solutions of alkalis or alkali salts either hot or cold. This test is found to be valuable as an indication of the suitability of raw materials for treatment according to the process about to be disclosed, although I do not wish to limit the materials to such as may react in this way and this alkaline treatment is in no sense a limiting part of this disclosure.

Bituminous coal, lignite and peat when fresh usually show a limited solubility in alkaline solutions, but when subjected by long exposure to oxygen or air, moisture, etc., show a marked increase in the amount that dissolves in alkaline solutions and also may be dispersed by my process.

Alkaline solutions of these organic earths have been prepared and used as water stains and for coloring paper, etc. However, it is evident that the usefulness of this color is limited to applications where water is not objectionable. This color cannot be used in lacquers, varnishes or other oily or non-aqueous mediums because of the water necessary for solution or dispersion. It is equally evident that if a similar color is prepared after the methods disclosed in this invention that is easily dispersed without the aid of water and may be used in paints, lacquers and other non-aqueous media, such a color would be very useful and find wide application.

Organic earths have been powdered to a pigment form, usually ground by mechanical means to pass a screen mesh of 200 to 325 to the inch. In this pigment form they have found a limited application for tinting paints, wood fillers, etc.

Alkaline solutions of organic earths are usually precipitated or agglomerated by acids, acid salts, alum, etc. Alkaline solutions of organic earths when dried yield a shiny black or brownish black solid. This material may likewise be dispersed according to my invention by using this alkaline treated material as raw material. However, it is not as satisfactory as untreated material since it contains more soluble salts which are uncolored and act as diluents.

It has been found in my experiments that the richness and depth of color is increased to a marked degree by dispersion or stating it another way, by reducing the particle size. It is believed that the particles after dispersion are essentially colloidal or ultra microscopic in size as it is found that pigments produced by my method pass easily through the finest screen, and remain suspended almost indefinitely in oily mediums, indicating virtually a solution.

Having designated the raw materials useful in applying this invention and calling attention to the desirable properties imparted by dispersion, I will now disclose the procedure by which dispersion is possible.

Four materials used in the proper sequence produce very satisfactory results. These are as follows:

1. A suitable raw material designated as organic earth either treated with alkali or untreated, or raw.

2. A medium, vehicle, solution or menstruum in which the dispersion is accomplished or effected, called the dispersing medium.

3. An acid electrolyte that produces or aids the dispersion of the color.

4. An alkaline electrolyte that neutralizes the acid electrolyte at the proper time and place and leaves the color dispersed.

1. Raw material

Organic earth, coal-like, lignite-like or peat-like is selected with reference to the final color desired, the color strength and the proportion of dispersible matter present. This material is usually dried in one of the many known ways to reduce the moisture content 10% or less at a temperature below the charring temperature which in this case is found to be less than 150° C. All these earths appear to be hygroscopic and will take up moisture when exposed to moist air. For this reason processing should follow drying rather closely. Moisture even up to 40% of the raw material does not interfere seriously with processing, but appears to lengthen the time necessary for complete dispersion. Since it must be driven out eventually as it is not desirable in the finished material, it is best to reduce it at first.

Grinding of the raw material to 200 mesh or finer hastens the reactions and while not essential is advisable as a matter of economy.

2. Dispersing medium

The solution or medium in which the actual dispersion is carried out is preferably made up of organic solvents that contain low percentages of water. Ordinary organic solvents meet all requirements. Water interferes more with mixing of the solvents than it interferes with dispersion. Considerable latitude in preparation of the dispersing medium is allowable. For simplicity and to avoid repetition, the preference is indicated below in the order I have found in my experiments to give best results.

Alcohols: methyl (wood), ethyl, propyl, butyl, amyl, higher alcohols.

Coal tar fractions: benzene, toluene, xylene, cresols, and creosote oils.

Ethers of the glycols: (ethylene, diethylene and triethylene).

Esters: ethyl acetate, butyl acetate, amyl acetate, ethyl lactate, etc.

Petroleum hydrocarbons: lighter fractions rather than solid.

My experiments indicate that certain generalizations hold, although it is not desired to limit the practice to such generalizations, but these are given merely as rough guides to practice.

It appears that mixtures of alcohols are better dispersing media than a single alcohol. Mixtures of alcohols and lighter coal tar fractions appear to be better than mixtures of alcohols alone. Most ethers of the ethylene glycols are fairly effective mediums alone but even better when mixed with alcohols and lighter coal tar fractions.

The effectiveness of the dispersing medium is judged by the completeness with which the organic earth will virtually all dissolve or disperse.

Thus in preparing a dispersing medium not only must price and availability of the solvents be considered, but the behavior of the particular organic earth in the dispersing medium as well. Thus proportioning of the organic solvents should follow experiments that show the best results.

Not wishing to limit the proportions or solvents except that they make good suspensions, the following proportions have produced good results and are cited as examples of effective suspending media Formula 1. A mixture comprising
   2 gallons of commercial methyl or wood alcohol (acetone which is commonly present does not interfere)
   1 gallon benzol (benzene)
   1 quart ethylene glycol mono ethyl ether Formula 2.
   2 gallons commercial denatured grain or ethyl alcohol
   1 gallon toluol (toluene) or xylol (xylene)

Formula 3.
   1 gallon methyl or denatured ethyl alcohol
   ½ gallon creosote oil, shingle stain oil or the like.

It is understood that the above are given as illustrations of good suspending or dispersing media and to illustrate the general statements above that mixtures of solvents appear to be more effective than single solvents except possibly some of the ethers of the glycols which appear to suspend the organic earth well when used alone.

In cases where it is desired to recover the dispersing medium by evaporating and condensation by well known methods, it is highly desirable to design the dispersing medium in such a way as to allow the solvents to evaporate at an even rate to avoid over taxing the condensers.

In some cases the dispersing medium may be marketable with the color in a paste or semi-liquid form. In such cases it is apparent that the dispersing medium must be chosen with reference to its compatibility with the use.

3. Acid electrolyte

An acid electrolyte is desirable to accomplish effective dispersion. Its action appears to be to lend an electric charge to the particles and thus permanently separate them sufficiently that they will not again cohere to each other. Strong commercial mineral acids accomplish this dispersion. Sulphuric, hydrochloric and nitric appear to produce about equally good results. Sulphuric acid appears to be preferable, however, as insoluble sulphates that may form are not so objectionable as chlorides or nitrates. Acid anhydrides which are usually gaseous are effective as are also acid salts, while salts, such as alum, are very slow and weak in their action. Since the object is mainly one of charging the particles during certain stages, the acid electrolyte is chosen rather for its quick effect, price and residue that is left in the color, rather than any action it may have chemically to change or vary the color.

4. Alkaline electrolyte

After dispersion is accomplished by means of the acid electrolyte, for most purposes it is desirable to neutralize the acid and restore the color to a virtually neutral condition. Here again the choice of the alkali is controlled more by the product produced by the interaction of the acid and alkali and whether such neutralization product is desirable in the finished product rather than for any specific property of the alkali itself, since it is indicated that the choice of alkali has little to do with particle size or color, but merely removes the acid. Except for convenience due to difficulty in finishing and filtering to remove the acid, the acid may be removed by washing with water. The color being essentially colloidal any method that uses filtration is almost certain to be troublesome.

Since the sulphates of both calcium and barium are common constituents of paints and paint materials, a hydroxide, oxide or carbonate of these elements makes a very satisfactory neutralizing agent. In certain cases a neutral product that may be vaporized at relatively low temperature may be highly desirable, in which case hydrochloric acid might be used to disperse the color and ammonia to neutralize the acid producing ammonium chloride which could be driven off as a vapor.

The amount of alkali to be added is best proportioned to exactly neutralize the acid present. In practice it is usually preferable to add a slight excess of alkali since such excess is seldom harmful and often assists later dispersion in oily vehicles due possibly to the formation of soaps with the oily acids.

Procedure

As an example of the procedure in making dispersed organic earth colors, the following may be taken as typical, but, as stated before, not limited to exact proportions nor ingredients.

In a suitable tank, vat or container, I place 100 pounds of a dispersing medium made up as follows:

| | Parts by volume |
|---|---|
| Methyl or wood alcohol | 2 |
| Commercial denatured ethyl alcohol | 1 |
| Mono-ethyl-ether of ethylene glycol | 1 |
| Xylene | 1 |

Into this is stirred about 30 pounds of dry powdered organic earth, such as oxidized or weathered lignite. After the organic earth is wetted and well distributed through the liquid, 3 pounds of commercial concentrated sulphuric acid is slowly added while stirring is continued. Heat is evolved and the mixture gradually thickens to a rich brown, oil-like liquid, gradually becoming thicker until nearly a paste-like consistency is reached. Approximately one-tenth of the weight of the dry organic earth gives about the proper amount of acid to be added when the acid is calculated on the pure acid basis. For instance, a mixture of half sulphuric acid and half water by weight would contain only half acid and it would thus require approximately 6 pounds of such a mixture to disperse 30 pounds of organic earth.

The amount of acid to be added is that amount that gives the maximum dispersion or acts on the entire mass, leaving no lumps or raw untreated material. Since it appears that the acid is only important to break up or disperse the organic earth and does not react with the earth in definite proportions, the amount is discretionary to the extent of producing the best dispersion. Since the finer the raw material is ground the less acid necessary, it would appear that reasonably fine grinding might be more economical than to use large amounts of acid in practice.

The mixture should now be allowed to stand until the acid has acted completely. This time may vary from a few hours or even minutes to a day or two. It appears that the finer the raw material is ground, the quicker is dispersion completed.

After dispersion is completed, a suitable alkali is added to neutralize the acid. In this example, we will assume that calcium oxide is used. For each 98 parts by weight of pure sulphuric acid calculated as $H_2SO_4$, 56 parts by weight of pure calcium oxide should be added, calculated as CaO. In the above example, assuming that three pounds of acid is used and this acid contains 95 per cent of pure sulphuric acid, it will thus require 1.63 pounds of pure CaO to neutralize the acid.

The lime may be added in the form of a thin slip made by moistening the lime with a little of the dispersing liquid and then stirring this slip into the vat of color, mixing it thoroughly. At this stage the product is improved if the whole liquid mass is passed through one of the several mills on the market that rubs or smears the mass in order to get better contact of the alkali and shorten the time of neutralization. This may also serve to rub out or grind any earthy or non-dispersible matter that was contained in the original raw material.

The mixture generally thickens further on the addition of the alkali, reaching the consistency of a semi-solid, or heavy paste.

For certain purposes, after the alkali has completely acted, this paste is ready for marketing or use. It is best to allow from twenty-four hours to a week if possible for the alkali to act, although this time may be shortened by grinding or rapidly mixing the mass.

In most cases the market may demand a dry powder, in which case the drying of the neutralized mass is the last stage in the process. This is accomplished most economically by drying in a closed or vacuum drier in which the vapors are drawn or forced through a condenser and liquefied to be used over and over, or the dispersing medium may be driven off by applying heat by any well known method of drying. Temperatures should preferably be kept below 150° C. as incipient charring starts at about this temperature.

After the mass is neutral and still in the paste form, oils, waxes, etc. may be mixed with the paste and then the whole mass subjected to vacuum drying, leaving the color dispersed in the oil or other substance and removing the lower boiling solvents used in dispersing the color. Mineral oil, naphtha, gasoline, in fact most any substance that is compatible with the dispersing medium may be added before drying, if desirable.

Aniline dyes or solutions of aniline dyes that have been made compatible with the dispersing medium may be added, preferably just before the neutralizing electrolyte, if colors that are variations of the brown base are desired.

In a similar way inert earthy matter or fillers, such as chalk, clay, silica or silicates, gypsum, plaster of Paris, pigments, etc. may be added at any suitable stage of manufacture, should such materials be desirable.

In certain cases, dyes in water solutions may be added to the color during the manufacture, so long as the water from the dye solutions does not predominate in the liquid used for dispersing.

The acid electrolyte may be added directly to the raw material if desired, the order not being essential except to be present to insure dispersion at the proper time.

It will be understood that the order of steps may be varied if desired without departing from the spirit of the invention, although the order herein set forth is preferred. It will also be understood that the neutralization of the dye may be omitted if an acid dye is desired.

What I claim is:

1. A process of producing chemically dispersed dyes, which comprises mixing a humic dye material normally insoluble in the common organic solvents with an organic solvent containing a mixture of an alkyl ether of the ethylene glycols and an alcohol, and a concentrated mineral acid, then neutralizing the acid.

2. A process of producing chemically dispersed dyes, which comprises mixing a humic dye material normally insoluble in the common organic solvents with an organic solvent containing a mixture of an alkyl ether of the ethylene glycols and benzene, and a concentrated mineral acid, then neutralizing the acid.

3. A process of producing chemically dispersed dyes, which comprises mixing a humic dye material normally insoluble in the common organic solvents with an organic solvent and a concentrated mineral acid, then neutralizing the acid and drying the neutralized mass to powder form.

4. A process of producing chemically dispersed dyes, which comprises mixing a humic dye material normally insoluble in the common organic solvents with an organic solvent and a concentrated mineral acid, then neutralizing the acid and adding oil to the neutralized mass.

5. A process of producing chemically dispersed dyes which comprises mixing a humic dye material normally insoluble in the common organic solvents with an organic solvent serving as a dispersion medium, completing the dispersion by adding a concentrated mineral acid serving as an acid electrolyte, allowing the mixture to stand until the dispersion is completed, then adding an alkali to neutralize the acid.

6. A process of producing dyes which comprises chemically dispersing a humic dye material normally insoluble in the common organic solvents, in a common organic solvent with the aid of a common commercial concentrated mineral acid.

7. A dye comprising a chemical dispersion in a common organic solvent of a humic dye material normally insoluble in the common organic solvent with the aid of a common commercial concentrated mineral acid.

8. A process of producing dyes as defined in claim 17, in which the organic solvent is a member of a group consisting of alcohols and members of the benzene series of hydrocarbons.

9. A dye as defined in claim 7, in which the organic solvent is a member of a group consisting of alcohols and members of the benzene series of hydrocarbons.

10. A process of producing dyes as defined in claim 17, in which the mineral acid is sulphuric.

11. A dye as defined in claim 7, in which the mineral acid is sulphuric.

12. A process as set forth in claim 6 wherein sufficient alkali is added to neutralize the acid.

13. A process as set forth in claim 6 wherein the organic solvent contains an alcohol.

14. A process as set forth in claim 6 wherein the organic solvent contains benzene.

15. A process as set forth in claim 6 wherein the organic solvent contains a homologue of benzene.

16. A process as set forth in claim 6 wherein the organic solvent contains creosote oil.

17. A process as set forth in claim 6 wherein the organic solvent contains a mixture of alcohols.

18. A process as set forth in claim 6 wherein the organic solvent comprises a mixture of an alkyl alcohol and a coal tar fraction of the aromatic series.

19. A dye as set forth in claim 7 wherein the organic solvent contains an alcohol.

20. A dye as set forth in claim 7 wherein the organic solvent contains benzene.

21. A dye as set forth in claim 7 wherein the organic solvent contains a homologue of benzene.

22. A dye as set forth in claim 7 wherein the organic solvent contains creosote oil.

23. A dye as set forth in claim 7 wherein the organic solvent contains a mixture of alcohols.

24. A dye as set forth in claim 7 wherein the organic solvent comprises a mixture of an alkyl alcohol and a coal tar fraction of the aromatic series.

25. A chemically dispersed dye comprising humic material, one of the common commercial concentrated mineral acids, an alkyl ether of the ethylene glycols and an alcohol.

26. A chemically dispersed dye comprising humic material, one of the common commercial concentrated mineral acids, an alkyl ether of the ethylene glycols and benzene.

LEONARD P. DOVE.